Nov. 18, 1947.　　C. H. SCULLIN　　2,431,144
EXTERNAL ANODE WITH COOLING FINS
Filed Dec. 11, 1942
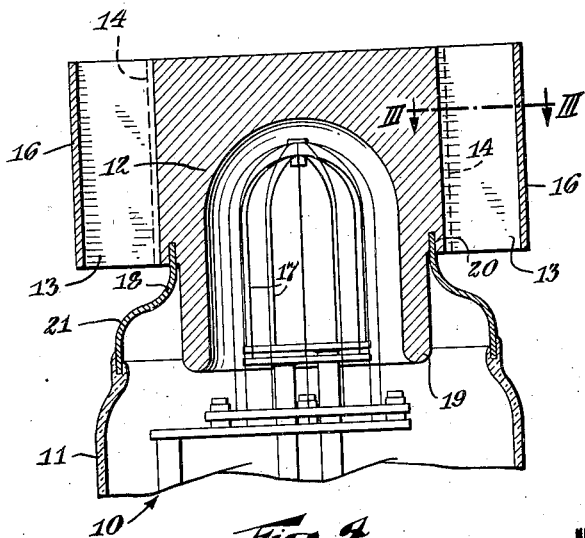
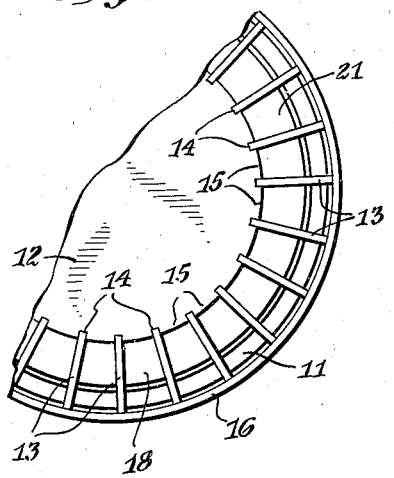
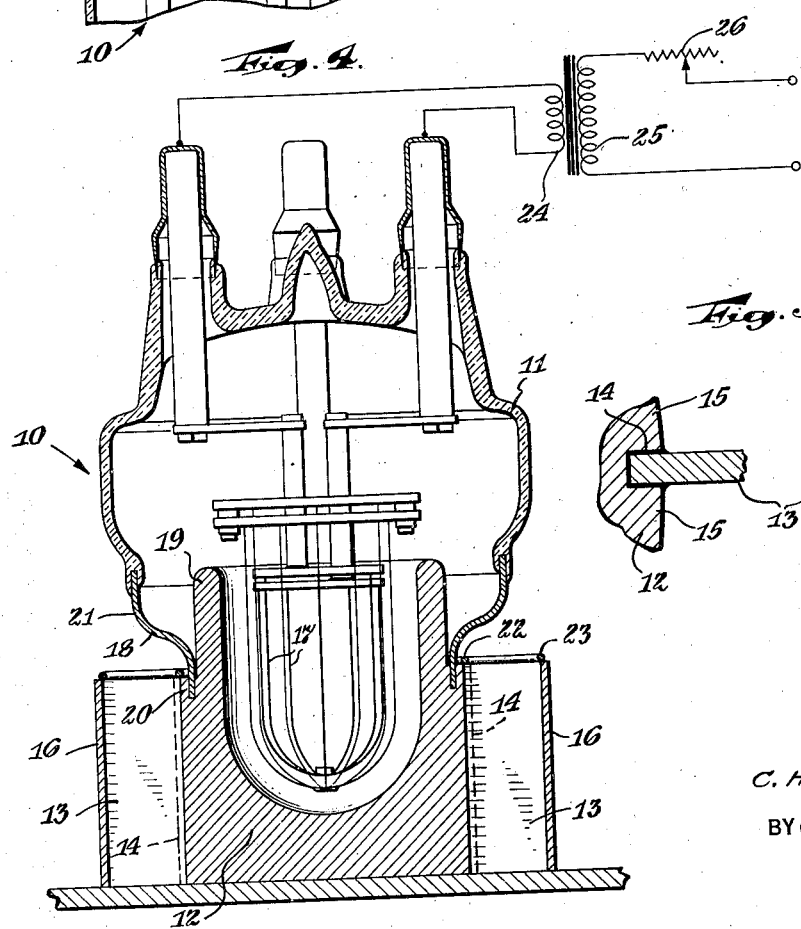
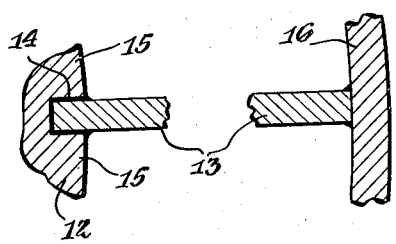
INVENTOR
C. H. SCULLIN.
BY
ATTORNEY Patented Nov. 18, 1947

2,431,144

UNITED STATES PATENT OFFICE 2,431,144

EXTERNAL ANODE WITH COOLING FINS

Carl H. Scullin, East Orange, N. J., assignor to Westinghouse Electric Corporation, East Pittsburgh, Pa., a corporation of Pennsylvania Application December 11, 1942, Serial No. 468,679

5 Claims. (Cl. 250—27.5)

This invention relates to anodes and method of making the same, and is an improvement upon the structure and method shown and described in prior patent to I. E. Mouromtseff and George M. Dinnick, No. 2,289,984 of July 14, 1942, for Air cooler for power tubes, assigned to the same assignee as the present invention.

In the prior art, and particularly as shown in the aforementioned patent, it has been common practice to provide cooling devices which are separate entities from the electron discharge device and after completion are applied to the electrode of the discharge device which it is desired to cool. The prior art constructions have involved the provision of a core structure upon which the fins are attached. The particular manner of attachment has included the application of solder to the fin edge next the core, insertion of the fin into a slot in the core and external application of heat to the core for softening the solder in place, followed by a sufficient cooling to cause the solder to harden and thereby attach the fin in place. This prior art method has involved a considerable expenditure of time and material in addition to the necessity to construct or provide a special heater for the softening of the solder. Furthermore the heat distribution in softening the solder by an external heater has obtained irregular results, in that too much heat is applied in some areas near the heater and not enough heat applied at areas remote from the heater.

In general, an object of the present invention is to overcome the deficiencies of the prior art constructions and methods.

Also, generally speaking, an object of the invention is to provide an improved method and resultant structure.

A further object of the invention is to provide a cooling structure for anodes which conserves metal and at the same time promotes effective heat radiation and cooling of the anode.

Another object of the invention is to provide a structure and method of fabrication whereby uniform and effective distribution of the solder is secured.

Yet another object of the invention is to avoid the use and necessity for an external extraneous heater for obtaining the melting and proper application of the solder in place.

Again, an object of the invention is to provide a structure and method enabling the fins to be directly applied to the anode without interposing a core structure for the fins.

Still further objects of the invention will appear as the description progresses, both by direct recitation thereof and by implication from the context.

Referring to the accompanying drawing, in which like numerals of reference indicate similar parts throughout the several views;

Figure 1 is a vertical sectional view of a part of an electron discharge device showing cooling fins applied to the anode thereof in accordance with my invention;

Figure 2 is a plan of a portion of said device and fins;

Figure 3 is an enlarged sectional view on line III—III of Fig. 1; and

Figure 4 is a further sectional view of the electron discharge device illustrating the method of applying the fins to the anode thereof.

In the specific embodiment of the invention illustrated in said drawing, the reference numeral 10 designates an electron discharge device having the usual envelope glass portion 11 and a copper or other metallic anode 12 also forming part of the envelope and sealed to the glass portion by means unique to the present invention. It is to the exterior of this metallic anode that a plurality of radiating fins 13 are directly attached by the method forming an important feature of the present disclosure and to constitute the structural assembly herein claimed. Attention is accordingly directed to the fact that the anode is constructed of adequate thickness of wall structure to enable a plurality of longitudinal grooves 14 to be formed therein, as by a milling operation or otherwise as found desirable. Said grooves are arranged in parallelism to each other and at close intervals around the entire cylindrical periphery of the anode with intervening lands 15 of the metal between the grooves and edge margins of the fins projecting into said grooves. The grooves have a width appropriately dimensioned with respect to the thickness of the inner margins of the fins to provide for adequate clearance between the fins and the lands for admission of solder in the fluid state therebetween. If so desired, the outer edges of the fins may abut against and be soldered to the inner periphery of an engirdling cylindrical ring 16 of suitable metal, such as copper.

Before attachment of the fins to the anode is effected, the glass portion 11 is sealed to the anode and such other electrodes as desired to be used, including a filament or cathode 17, are permanently mounted in place. Sealing of the glass portion of the envelope to the anode is obtained by interposing a sealing collar 18 therebetween.

As shown, the anode is constructed with a thinned neck 19 at its end toward the glass portion of the envelope, the inner cylindrical face of the neck being in continuation of the inner face of the main part of the anode cavity, and the outer face of the neck, likewise cylindrical, is of less diameter than the outer diameter of the anode body and preferably approximately flush with the bottoms of the grooves 14. It is also preferable to provide a circumferential channel 20 at the base of the neck behind the ends of the adjacent lands 14. The afore-mentioned collar 18 has one end, which is arbitrarily called the inner or smaller end, inserted in said channel and has its inner peripheral face for a part of the length of the collar juxtaposed against and brazed or otherwise permanently secured to the outer face of the neck portion in the region next said channel. Said collar flares toward its outer end, as at 21 so as to be off-set from the neck, and this said outer end is sealed to the glass in suitable manner. As shown, and by preference, the collar is composed essentially of an alloy of cobalt and iron and nickel, in accordance with the disclosure in Patent 2,062,335 of December 1, 1936, by Howard Scott and assigned to the same assignee as the present invention. The glass forming the glass portion of the envelope is, for use with the alloy collar, boro-silicate glass as also referred to in said Howard Scott patent. Other material than the specific alloy stated and other glass than the specific boro-silicate glass may be employed if desired. The length of the collar and neck have been shown substantially of equal length, by virtue of which the neck forms an electric-field shield for the juncture of the glass with the metal.

In order to secure the fins in place in their respective grooves, the device, with fins inserted in place in the grooves is stood on end as shown in Figure 4 with the fins and anode at the bottom and the glass portion of the envelope thereabove. This situation of the parts mentioned prevents any solder in the molten state from flowing toward the glass and avoids any possibility of cracking the glass from engagement therewith of molten solder. Resting the ends of the fins on a flat surface likewise closes the lower ends of the channels between fins and deters circulation of air therebetween. A ring of solder 22 is rested on the upper ends of the fins and lands next the collar, and another ring of solder 23 is rested on the ends of the fins next the outer ring 16. The filament 17 of the electron discharge device is then heated by a suitable current flow, a source of current being shown as the secondary 24 of a transformer excited by alternating current supplied to a primary 25 thereof through an appropriate regulating means such as the potentiometer 26 indicated. Heat from the filament, which may be operated above normal temperature at this stage and without the air circulation through the fins, acts upon the anode to heat the same far beyond its normal temperature of use and sufficient to melt the solder which then is free to gravitate downward. The solder of the ring of solder at the inner edges of the fins will flow downward to fill the clearance space of the grooves 14 from end to end thereof with a meniscus forming at the junction of the fin surfaces with the lands of the anode adjacent thereto. Similarly the solder of the outer ring will gravitate downward at the junction of the fins and ring, also forming a meniscus next the junction on both faces of each fin. The heat may be regulated to govern the viscosity of the solder and is finally discontinued when the solder attains its desired extended contact throughout the height of the grooves and ring with the parts at the junctures mentioned. The method employed accordingly requires no extraneous heater, the filament of the device serving the purpose, and the heat is distributed throughout the anode and length of all the fins so that a uniform and very secure attachment is accomplished. It may be added, that for purposes of salvage, the filament may be heated up in manner similar to that described above and the solder melted, thereby permitting removal of the fins for re-use.

It is furthermore to be understood that the present disclosure has been made by way of exemplifying the invention and accordingly is to be considered as illustrative rather than restrictive of the concept of invention forming the basis of the matter presented.

I claim:

1. An electron discharge device comprising an anode having grooves in its outer periphery, fins in said grooves, and a neck comprised as a continuing part of the anode and projecting in a direction longitudinally beyond the ends of said grooves and of less exterior diameter than the grooved part of the anode, the interior of the anode forming a continuous smooth surface within both the grooved portion and the neck, and a cathode both within the grooved portion of said anode for direct heat radiation therethrough to said fins and within said neck for electronic discharge to said continuous smooth surface.

2. An electron discharge device comprising an anode having a body portion, having a neck comprised as a continuing part of the anode and projecting longitudinally beyond the body portion, a cathode in said body portion and neck, said neck having an outside diameter less than the outside diameter of said body portion, a collar secured in juxtaposition to and around a part of said neck and having a part engirdling said neck in spaced relation from said neck and substantially as long as said neck, and a glass envelope portion sealed to the said collar.

3. An electron discharge device comprising a hollow anode having an open end and a closed end, a cathode in said anode, a collar secured to the exterior of said anode intermediate of and spaced from the ends of said anode, said collar flaring from the anode and said collar and anode being hollow and opening in the same direction with the flare of the collar spacing the open ends of anode and collar laterally apart, said open ends being substantially at a common plane, and a glass envelope sealed to said collar, said closed end of the anode having larger outside diameter than the outside diameter of the open end thereof, the end of smaller diameter being within the envelope and the end of larger diameter being outside the envelope for heat radiation.

4. An electron discharge device comprising a cathode of dome shape, an anode having a hollow of dome shape corresponding to the shape of the cathode and coaxial therewith, said dome shape hollow having one end closed and the other end open for receiving the cathode, said anode having an exterior circumferential shoulder near to and facing in the same direction as the open end of said anode, a collar projecting from said shoulder substantially as far as the open end of the anode, and a glass envelope sealed to said collar, the part of the anode from said shoulder to the closed end of the anode containing in the hollow thereof a substantial part of the cathode and the exterior of said part of the anode being exposed beyond the collar to the exterior of the device and providing radial radiation of heat from the dome shaped hollow to the exterior.

5. An electron discharge device comprising a cathode of dome shape, an anode having a hollow of dome shape corresponding to the shape of the cathode and coaxial therewith, said dome shape hollow having one end closed and the other end open for receiving the cathode, said anode having an exterior circumferential shoulder near to and facing in the same direction as the open end of said anode, said shoulder having a channel opening, a collar seated in said channel and projecting therefrom substantially as far as the open end of the anode, and a glass envelope sealed to said collar, the exterior of the anode from said shoulder to the closed end of the anode being exposed to the exterior of the device and providing radial radiation of heat from the dome shaped hollow to the exterior.

CARL H. SCULLIN.

REFERENCES CITED

The following references are of record in the file of this patent:

UNITED STATES PATENTS

| Number | Name | Date |
| --- | --- | --- |
| 2,310,936 | Chevigny | Feb. 16, 1943 |
| 2,330,032 | Dailey | Sept. 21, 1943 |
| 2,345,794 | Chevigny | Apr. 4, 1944 |
| 2,046,808 | Bouwers | July 7, 1936 |
| 2,090,638 | Olshevsky | Aug. 24, 1937 |
| 1,668,508 | Kettering | May 1, 1928 |
| 1,840,724 | Koehring | Jan. 12, 1932 |
| 1,903,945 | Shimizu | Apr. 18, 1933 |
| 2,289,984 | Mouromtseff | July 14, 1942 |